(12) United States Patent
Janak et al.

(10) Patent No.: US 9,702,176 B2
(45) Date of Patent: Jul. 11, 2017

(54) SPRING LOADED ACTUATOR ASSEMBLY

(71) Applicant: ITT Manufacturing Enterprises LLC, Wilmington (DE)

(72) Inventors: John M. Janak, West Seneca, NY (US); Timothy J. Boerschig, Amherst, NY (US); Mark J. Ott, Orchard Park, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 274 days.

(21) Appl. No.: 14/324,614

(22) Filed: Jul. 7, 2014

(65) Prior Publication Data
US 2016/0002965 A1 Jan. 7, 2016

(51) Int. Cl.
*E05F 1/14* (2006.01)
*E05F 1/10* (2006.01)

(52) U.S. Cl.
CPC ............. *E05F 1/14* (2013.01); *E05F 1/105* (2013.01)

(58) Field of Classification Search
CPC .... E05F 1/14; E05F 1/105; E05F 1/08; E05Y 2800/122; E05Y 2900/502; B64D 11/003
USPC ......... 267/211; 244/118.1; 312/319.1, 319.2; 16/277, 278, 279, 293, 304
See application file for complete search history.

(56) References Cited

U.S. PATENT DOCUMENTS

| | | |
|---|---|---|
| 4,263,694 A | 4/1981 | Jentsch |
| 4,382,311 A | 5/1983 | Watts |
| 4,462,623 A | 7/1984 | Grant |

(Continued)

FOREIGN PATENT DOCUMENTS

| | | | | |
|---|---|---|---|---|
| DE | 2917006 A1 | * | 10/1980 | ........... E05C 19/165 |
| DE | 34 01 427 A1 | | 7/1985 | |

(Continued)

OTHER PUBLICATIONS

SAE Technical Paper 2006-01-1538; entitled: Spring Force Line Based Damper Friction Control for Coil-Over Shock Applications; Apr. 3, 2006; Nishikawa et al.; 1 page.

(Continued)

*Primary Examiner* — Thomas J Williams
(74) *Attorney, Agent, or Firm* — Barclay Damon, LLP

(57) ABSTRACT

A spring loaded actuator assembly includes a first member having a set of rails, a second member configured to translate axially relative to the first member and a third member configured for translational movement within the second tubular member. The second and third members each include a set of ramp-like teeth configured to engage one another when the third member is moved within the second member; and grooves configured to engage the rails of the first member and permit translational movement of the second and third members relative to the first member while preventing rotational movement of the second and third members. A coil spring is disposed between the first and second members wherein translational movement of the second member beyond a predetermined axial position causes the ramp-like teeth of the second member to extend beyond the rails, causing the second member to rotate and the ramp-like teeth to be retained by the rails of the first member, thereby maintaining the coil spring in a compressed condition while enabling the third member to be freely movable axially.

17 Claims, 8 Drawing Sheets

(56) References Cited

U.S. PATENT DOCUMENTS

| | | |
|---|---|---|
| 4,660,250 A | 4/1987 | Tillman et al. |
| 4,760,621 A | 8/1988 | Stromquist |
| 4,785,493 A | 11/1988 | Tillmann et al. |
| 4,893,522 A | 1/1990 | Arakawa |
| 4,894,883 A | 1/1990 | Fleischhauer |
| 4,999,872 A | 3/1991 | Jentsch |
| 5,120,093 A | 6/1992 | Carney |
| 5,157,806 A | 10/1992 | Wartian |
| 5,165,507 A | 11/1992 | Ohshima |
| 5,211,269 A | 5/1993 | Ohshima |
| 5,495,639 A | 3/1996 | Wartian |
| 5,579,874 A | 12/1996 | Jeffries et al. |
| 5,630,248 A | 5/1997 | Luca |
| 5,771,742 A | 6/1998 | Bokaie et al. |
| 5,802,670 A | 9/1998 | Bienek |
| 5,832,562 A | 11/1998 | Luca |
| 5,842,255 A | 12/1998 | Luca |
| 5,901,412 A | 5/1999 | Jentsch |
| 5,975,228 A | 11/1999 | Parfitt |
| 6,062,352 A | 5/2000 | Shinozaki et al. |
| 6,154,924 A | 12/2000 | Woo |
| 6,273,405 B2 | 8/2001 | Okamoto |
| 6,317,922 B1 | 11/2001 | Kondratuk |
| 6,336,252 B1 | 1/2002 | Bando |
| 6,460,839 B2 | 10/2002 | Müller |
| 6,615,449 B1 | 9/2003 | Alvarez |
| 6,615,897 B2 | 9/2003 | Dorma |
| 6,622,963 B1 | 9/2003 | Ahrendt et al. |
| 6,634,058 B1 | 10/2003 | Lin |
| 6,640,387 B2 | 11/2003 | Alonso |
| 6,705,205 B2 | 3/2004 | Gaudette |
| 6,976,289 B1 * | 12/2005 | Luca ............... E05F 3/108 16/49 |
| 7,032,271 B2 | 4/2006 | Lin |
| 7,090,314 B2 | 8/2006 | Burrows et al. |
| 7,234,569 B2 | 6/2007 | Salice |
| 7,275,284 B2 | 10/2007 | Lautenschläger et al. |
| 7,347,308 B2 | 3/2008 | Tomiji |
| 7,377,500 B2 | 5/2008 | Tomiji et al. |
| 7,464,437 B2 | 12/2008 | Song |
| 7,628,257 B1 | 12/2009 | Lu |
| 7,657,970 B2 | 2/2010 | Artsiely |
| 7,730,579 B2 | 6/2010 | Coe |
| 7,845,050 B2 | 12/2010 | Pyo |
| 7,921,511 B2 | 4/2011 | Johnson |
| 8,025,135 B1 | 9/2011 | Lu |
| 8,051,534 B1 | 11/2011 | Luca |
| 8,052,233 B2 | 11/2011 | Netzer et al. |
| 8,307,495 B1 | 11/2012 | Berkseth |
| 8,307,496 B2 | 11/2012 | Wu |
| 8,443,488 B2 | 5/2013 | Zhang |
| 8,522,934 B2 | 9/2013 | Born |
| 8,528,708 B2 | 9/2013 | Sakai et al. |
| 8,533,909 B2 | 9/2013 | Minegishi et al. |
| 2003/0132072 A1 | 7/2003 | Sawai et al. |
| 2005/0173216 A1 | 8/2005 | Meernik et al. |
| 2007/0187198 A1 | 8/2007 | Born et al. |
| 2010/0162522 A1 | 7/2010 | Han et al. |
| 2010/0287729 A1 | 11/2010 | Jin et al. |
| 2011/0094056 A1 | 4/2011 | Lautenschläger |
| 2012/0167472 A1 * | 7/2012 | Taniguchi ............... B60K 15/05 49/386 |

FOREIGN PATENT DOCUMENTS

| | | |
|---|---|---|
| EP | 2 181 040 B1 | 11/2011 |
| JP | 10-088899 A | 4/1998 |
| JP | 2007-247882 A | 9/2007 |
| WO | WO 2004/095982 A1 | 11/2004 |
| WO | WO 2007/106077 A2 | 9/2007 |
| WO | WO 2009/024654 A1 | 2/2009 |
| WO | WO 2009/025634 A1 | 2/2009 |
| WO | WO 2009/115662 A2 | 9/2009 |
| WO | WO 2011/150095 A1 | 12/2011 |

OTHER PUBLICATIONS

Modeling and Design of Robotic Systems Having Spring-Damper Actuators; Year: 2000; Berbyuk et al.; 1 page.

Journal of Sound and Vibration; vol. 214, No. 1; Jul. 1998; Wu et al.; entitled: Modelling the Static and Dynamic Behavior of a Conical Spring by Considering the Coil Close and Damping Effects; 1 page.

* cited by examiner

SPRING LOADED ACTUATOR ASSEMBLY

TECHNICAL FIELD

This application is directed to a spring-loaded actuator assembly that enables an assist force to be selectively retained and released relative to an object, such as an aircraft stowage bin, in order to reduce the amount of force required to open and close the object, for example, depending on the amount of weight that is present or in the presence of an over center condition.

BACKGROUND

There are a number of assemblies that utilize actuators, such as those presently found in and used in the opening and closing of an object, such as a door or enclosure mechanisms. According to one example, requirements dictate that the hand force required to close a pivot type stowage bin on a commercial aircraft can be no more than 25 lbs when the stowage bin is loaded with luggage. As a result, there is a general need in the field to provide a device that can provide a sufficient lift assist force when needed, therefore decreasing the hand force that is required to close the stowage bin.

According to another example, an actuator is required to provide assistance in the opening of an aircraft engine cowl. Due to the location of the typical mounting points of the actuator, the actuator length must shorten (i.e., compress) upon initial opening of the cowl. As the cowl rotates, the actuator reaches a point where its axis is in line with the pivot point (e.g. an over center condition), and the actuator is at its minimum length. As the cowl continues to rotate and pass the over center condition, the actuator extends over the remainder of the cowl rotation until the cowl reaches the open position. It is desired that the actuator does not impede the opening of the engine fan cowl during the initial opening before the over center condition and provide an assisting extension force after passing the over center condition.

The problem for the foregoing is in providing a spring actuator that compresses freely for the initial opening of the cowl. As the actuator passes the over center condition, the actuator should provide a spring extension force as the actuator extends to aid in opening the engine fan cowl for the remainder of the rotation. When closing the cowl, the actuator must provide a resisting extension force as the actuator compresses until the actuator again passes the over center condition, then capture the spring force so that the unit extends freely for the remainder of the cowl closing rotation.

BRIEF DESCRIPTION

In accordance with a first aspect, there is provided a spring loaded actuator assembly comprising:
a first member having a first keying feature;
a second member configured to translate axially relative to the first member;
a coil spring biasedly connecting the first member with the second member; and
a third member configured for translational movement within the second tubular member, each of the second and third members including:
  a set of ramp-like teeth configured to engage one another when the third member is axially moved within the second member; and
  a second keying feature configured to engage the first keying feature of the first member and permit translational movement of the second and third members relative to the first member while preventing rotational movement of the second and third member,
wherein translational movement of the second member beyond a predetermined axial position causes the ramp-like teeth of the second member to extend beyond the first keying feature and causes the second member to be axially restrained, thereby maintaining the coil spring in a compressed condition while enabling the third member to freely move telescopically from the assembly.

In one version, the first keying feature is a set of axially disposed rails and the second keying feature is a corresponding set of grooves sized and configured to pass over the rails and enable translational movement of the second and third members relative to the first member.

According to at least one embodiment, the second and third members are tubular members in which the ramp-like teeth are disposed on a distal end thereof, the teeth permitting engagement between the second and third tubular members based on telescopic movement of the third tubular member.

In one version, the first member is a rod having a set of external rails configured to engage the grooves of the second and third members and enable relative movement over the rod. In another version, the first member is a tubular member having a set of internal rails and in which the second and third members are configured to translate within the interior of the first member.

According to at least one embodiment, the second member is configured such that the ramp-like teeth pass the rails of the first member, which decouples the second and third members, constrains the coil spring in a locked or stored position and permits free telescopic movement of the third member. Corresponding movement of the third member can release the restrained second member and release the coil spring, thereby providing an assist force.

According to another aspect, there is provided a spring loaded actuator assembly comprising:
a first member having a set of rails;
a second member configured to translate axially relative to the first member;
a third member configured for translational movement within the second tubular member, each of the second and third members including:
  a set of ramp-like teeth configured to engage one another when the third member is moved within the second member; and
  grooves configured to engage the rails of the first member and permit translational movement of the second and third members relative to the first member while preventing rotational movement of the second and third members; and
a coil spring disposed between the first and second members wherein translational movement of the second member beyond a predetermined axial position causes the ramp-like teeth of the second member to extend beyond the rails, causing the second member to rotate and the ramp-like teeth to be retained by the rails of the first member, thereby maintaining the coil spring in a compressed condition while enabling the third member to be freely movable axially.

According to yet another aspect, there is provided a spring-loaded actuator assembly, comprising:
a rod including a set of axially extending rails;

a pair of movable hollow tubular members in which a first of the tubular members is configured to move within the remaining tubular member, each of the tubular members including:

a set of grooves configured to engage the rails of the rod to permit axial movement but prevent rotation; and ramp-like teeth that couple the first and second tubular members for axial movement when engaged; and a coil spring having ends attached to the rod and the second tubular member wherein translational movement of the second tubular member beyond a predetermined axial position causes the ramp-like teeth of the second tubular member to extend beyond the rails, causing the second tubular member to rotate and the ramp-like teeth to be retained by the rails of the rod, thereby maintaining the coil spring in a compressed condition while enabling the first tubular member to be freely movable axially.

A traditional spring actuator simply provides an extension or resisting spring force to assist in the opening or closing of an object such as an engine fan cowl, stowage bin door, exit door and the like. The herein describe actuator assembly provides the ability to capture and release the spring force, such as when used in an over center condition.

As a result, an actuator assembly is provided that provides a spring lift assist force when needed, for example, in the case of heavily loaded stowage bins or other objects, and permits spring free actuation when a spring lift assist force is not required, such as in the instance of a lightly loaded or empty stowage bin.

Using the herein described spring actuator assembly, a device can be used depending on the loading, to either retain the spring lift assist force or release the spring lift assist force, as needed. For example and with the spring lift assist force retained, the device does not impede the opening and closing of the bin. As described herein, a telescoping tubular member simply glides axially between the actuator and the bin or the frame attachment point.

These and other features and advantages will be readily apparent from the following Detailed Description, which should be read in conjunction with the accompanying drawings.

DETAILED DESCRIPTION

The following relates to various exemplary embodiments of a spring loaded actuator assembly for use in specific applications. However, it will be readily apparent that the actuator assembly can assume other configurations and that other suitable applications can be employed using the inventive concepts discussed herein.

Certain terms are used throughout the course of this description in order to provide an adequate frame of reference in regard to the accompanying drawings. These terms which may include "upper", "lower", "distal", "proximal", "inner", "outer", "above", "below", "within", "interior", "exterior" and the like should not be so interpreted to preclude the scope of the inventive concepts described herein, including the appended claims, unless so specifically indicated.

In addition, the accompanying drawings are merely intended to adequately and specifically convey the inventive concepts of the herein described spring actuator assembly and typical use environments. The reader, however, should not rely upon the drawings as they are not necessarily provided to scale.

The terms "an", "the" and the like are used throughout this discussion. It should be apparent, however, that these terms can include multiple versions.

Figure 1:
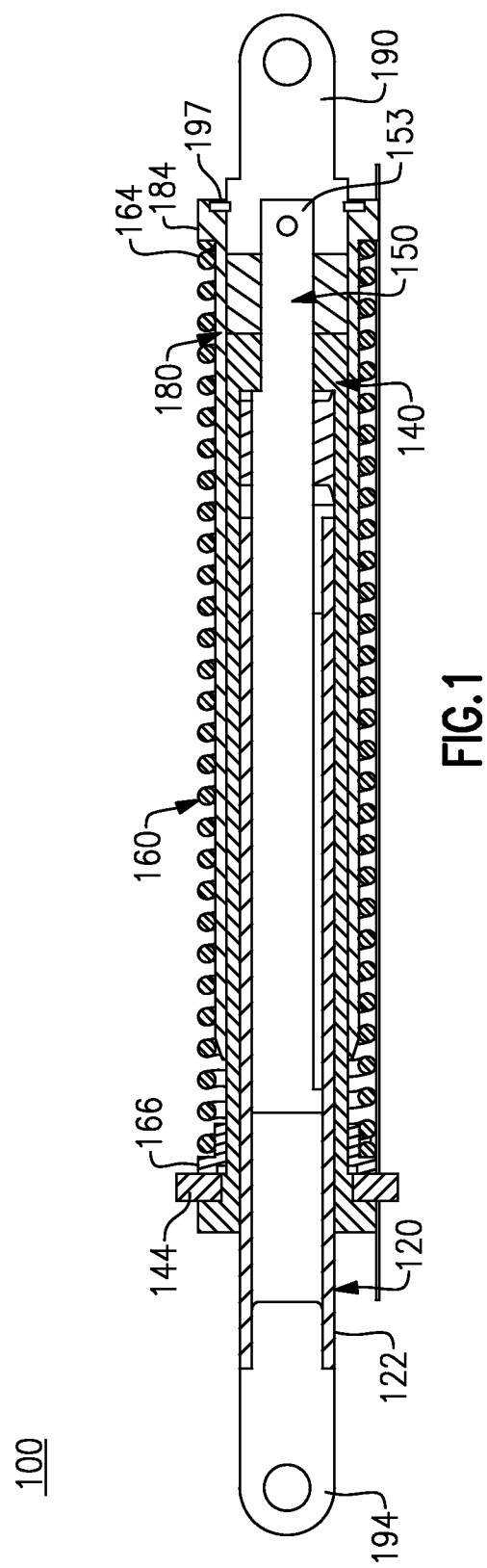
FIG. 1 is a side elevational view, shown partially in section, of a spring actuator assembly made in accordance with an exemplary embodiment.
Figure 2:
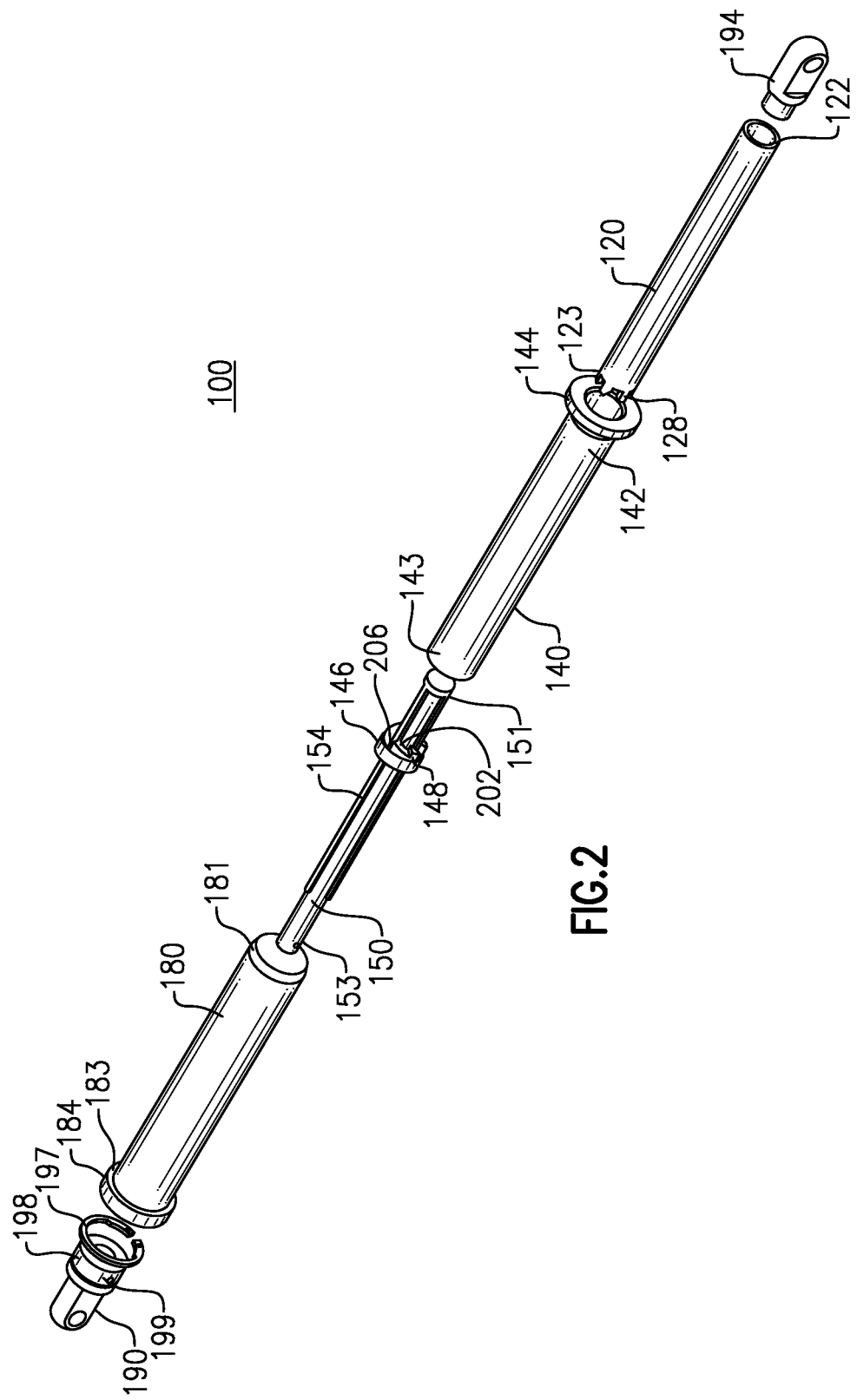
FIG. 2 is a partial exploded assembly view of the spring loaded actuator assembly of FIG. 1.

A first exemplary embodiment of a spring loaded actuator assembly 100 is herein described with reference to FIGS. 1-10. Referring first to FIGS. 1 and 2, the spring loaded actuator assembly 100 comprises a pair of tubes; namely, a first tubular member 120 and a second tubular member 140. Each of the first and second tubular members 120, 140 according to this embodiment is defined by hollow interiors and in which the interior of the second tubular member 140 is sized to receive the first tubular member 120 therein. A substantially cylindrical rod 150 is further provided that is sized extend through a portion of the hollow interior of each of the first tubular member 120 and second tubular member 140. A coil spring 160 (not shown in FIG. 2 for reasons of clarity) provided on the exterior of the herein described actuator assembly 100 is defined by a pair of opposing ends 164, 166 in which the coil spring 160 is axially disposed along the exterior surface of a cylindrical spring retainer 180 and in which the opposing ends 164, 166 of the coil spring 160 fixedly engage a shoulder 184 at the distal end 183 of the spring retainer 180 and a shoulder 144 similarly provided at the proximal end 142 of the second tubular member 140, respectively. A proximal end 153 of the rod 150 is engaged fixedly with a clevis 190, the latter having an engagement portion 198 that includes a peripheral groove 199 configured to fit a retaining ring 197. A similar connecting element, such as a clevis 194, is fitted within the proximal end 122 of the first tubular member 120.

According to this embodiment, the first tubular member 120 includes a set of ramp-like teeth 128 extending axially from the distal end 123 of the first tubular member 120 and n which the teeth are circumferentially disposed. Another set of ramp-like teeth 148 are provided on a cylindrical section 146 that is press fitted or pinned into the distal end 143 of the second tubular member 140. The ramp-like teeth 148 are oppositely disposed toward the proximal end 142 of the second tubular member 140 and are defined by a ramped or angled surface 202, and a series of through openings 206, between the ramp-like teeth 148. According to this embodiment, a total of six (6) ramp teeth 128, 148 are circumferentially disposed on each of the first and second tubular members 120, 140, although it will be readily apparent this number can easily be varied.

The substantially cylindrical rod 150 includes a set of external rails 154 formed along the length of the rod 150, the rails 154 being circumferentially spaced about the exterior of the rod 150 and extending in parallel from the proximal end 151 of the rod 150 over the majority of the length of the rod 150, but not including the distal end 153 thereof. Each of the first and second tubular members 120, 140 further include keyways disposed along a portion of the length of the tubular members 120, 140 and commencing at the distal ends 123, 143, respectively, including the openings 206 of the cylindrical section 146 aligned therewith. The openings 206 are equivalent in number to the number of external rails 154 and are sized to pass through the rails 154 to permit axial/translational movement of the second tubular member 140 in the herein described assembly 100, but without rotational movement.

Figure 3:
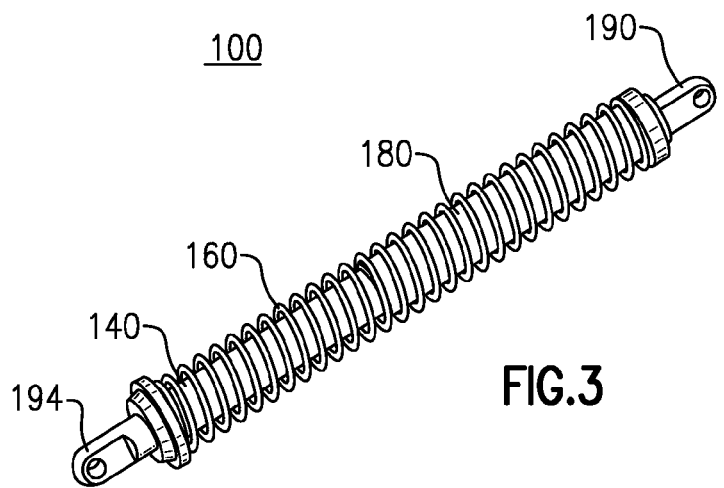
FIGS. 3-5 depict perspective view of the spring loaded actuator assembly of FIGS. 1 and 2 in an extended position, a compressed position and extended in a spring retained position, respectively.

For purposes of this discussion, the herein described actuator assembly 100 is capable of assuming various positions based on the relative movement of the first tubular member 120 and the second tubular member 140 with respect to the rod 150. First and as shown in FIG. 3, the actuator assembly 100 can assume an extended position in which the first and second tubular members 120, 140 are each disposed at the extent of the coil spring 160 and in which a spring force is released. In this position, the ramp-like teeth 128, 148 of the first and second tubular members 120, 140 are engaged with one another wherein each of the first and second tubular members 120, 140 can be moved away from the opposing end 190 of the actuator assembly 100 in unison against the biasing force of the extended coil spring 160.

Figure 6:
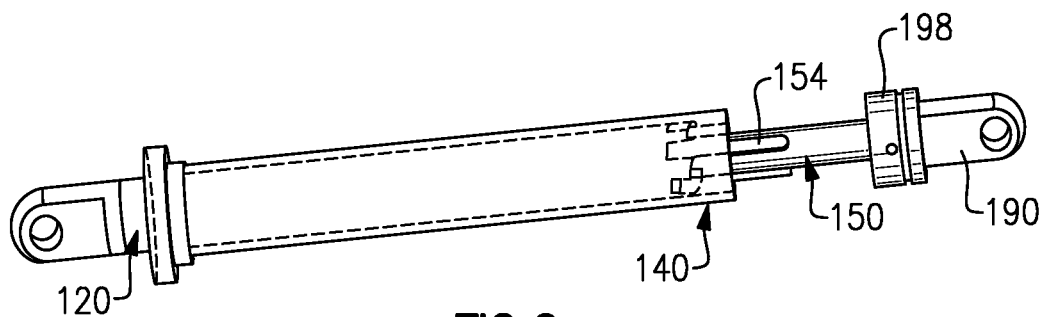
FIG. 6 is a partially sectioned view of the spring loaded actuator assembly of FIGS. 1-3(*c*) in a partially compressed position.
Figure 7:
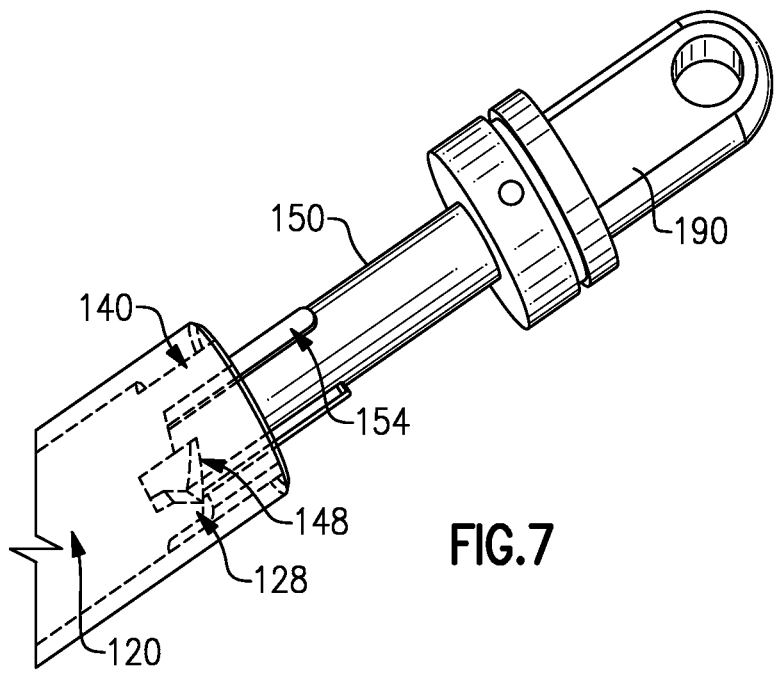
FIG. 7 is an enlarged partial broken away view of the spring loaded actuator assembly of FIG. 4, showing the relative engagement between tubular members of the assembly.

FIGS. 6 and 7 each further illustrate an intermediate position in which the first tubular member 120 and second tubular member 140 are moving in unison away from the opposing end 190 of the assembly 100 based on the engagement between the ramp-like teeth 128, 148 and movement over the rails 154 of the rod 150. For the sake of clarity, the coil spring 160 and the spring retainer 180 are not shown in FIGS. 6 and 7. As shown herein, the openings in the cylindrical section 146 of the second tubular member 140 are aligned with the external rails 154 of the fixed rod 150 to permit only axial (translational) movement without rotation and in which the coil spring 160 is being compressed or extended based on movement of the first and second tubular members 120, 140 with respect to the rod 150. More specifically, each tooth 128 is disposed against the angled surface of a tooth 148.

Figure 4:
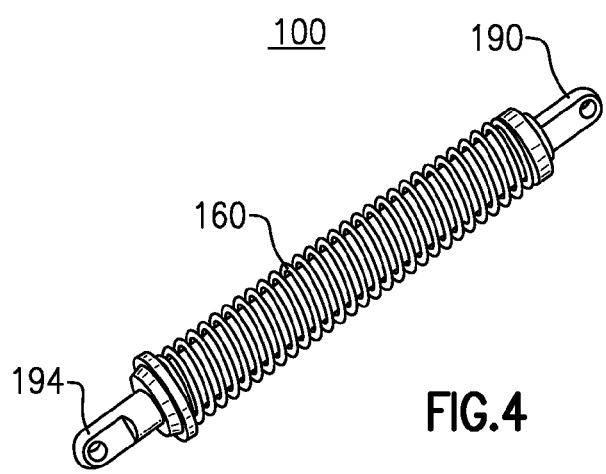
Figure 5:
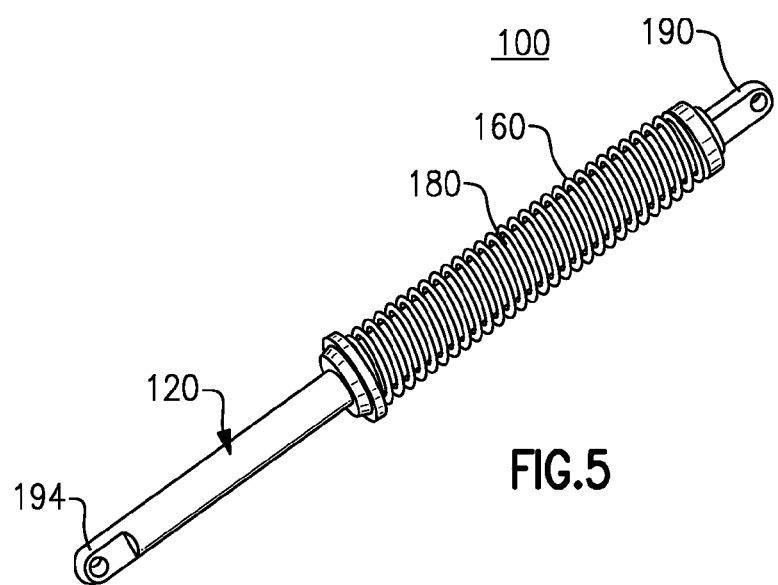

Reference is now made to FIG. 4, which depicts a retained compressed position of the herein described actuator assembly 100. In this position, the coil spring 160 is fully compressed based on translational movement of the first and second tubular members 120, 140 toward the opposing end 190 of the assembly 100. Over this range of movement, the ramp-like teeth 128 and 148 of the first and second tubular members 120, 140 remain in engagement with one another over the external rails 154 of the cylindrical rod 150 and also continue to permit only translational movement and prevent the first and second tubular members 120, 140 from rotating.

Figure 8:
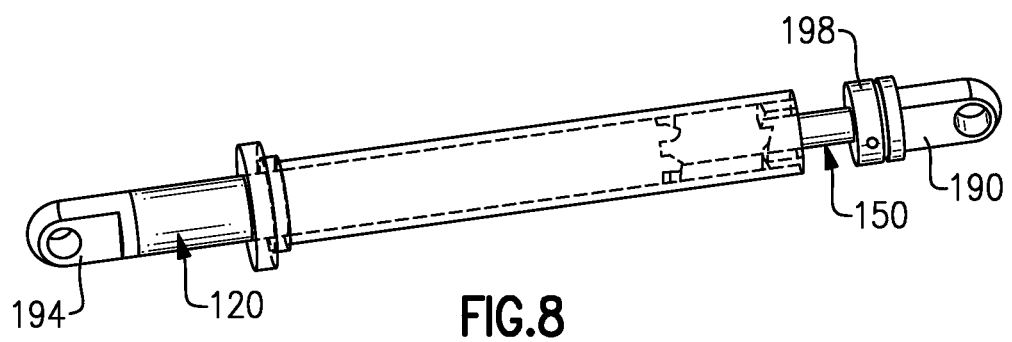
FIG. 8 is a partially section view of the spring loaded actuator assembly of FIGS. 1-5 in the spring retained position.
Figure 9:
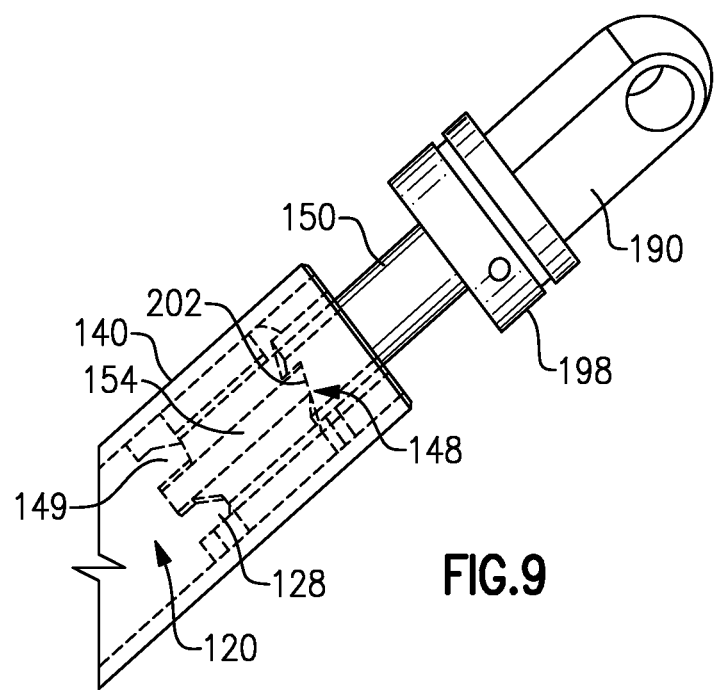
FIG. 9 is an enlarged partially broken away view of the spring loaded actuator assembly of FIG. 6.

In this latter position, the cylindrical section 146 of the second tubular member 140 is configured to advance beyond the end of the external rails 154 during compression of the coil spring 160. As a result, the second tubular member 140, including the openings 206 of the cylindrical section 146 are no longer engaged with the cylindrical rod 150. Due to the continued engagement between the ramp-shaped teeth 128, 148 and the angled configuration of the mating surfaces, the second tubular member 140 is caused to rotate and in which the keyways of the first tubular member 120 remain engaged with the external rails 154 of the rod 150. This rotation of the second tubular member 140 disengages the ramp-like teeth 124 of the first tubular member 120 from the second tubular member 140 and causes the angled surfaces of the ramp-like teeth 148 of the second tubular member 140 to become engaged with the ends of the external rails 154. In this position, the second tubular member 140 is constrained from axial movement and further constrains the attached coil spring 160, resulting in the retained position as shown in FIG. 4. Referring to FIGS. 8 and 9, the first tubular member 120 is free to axially move from this position while the second tubular member 140 remains stationary. Subsequently, the actuator assembly 100 can assume the fully extended position shown in FIG. 5, based on outward movement of the first tubular member 120. The movement creates a telescoping action in which the first tubular member 120 fully extends while the coil spring 160 and the second tubular member remains compressed.

From this latter position, the first tubular member 120 can be caused to again translate axially to a fully compressed position shown in FIG. 4. When resuming this latter position, the first tubular member 120 re-engages the ramp-like teeth 148 of the second tubular member 140 causing the ramp-like surfaces 128 to be realigned based on rotation of the second tubular member 140. Upon movement of the coupled first and second tubular members 120, 140, the coil spring 160 is released from the retained position of FIG. 4 and the assembly 100 reverts to the extended and released position shown at FIG. 3.

Figure 10:
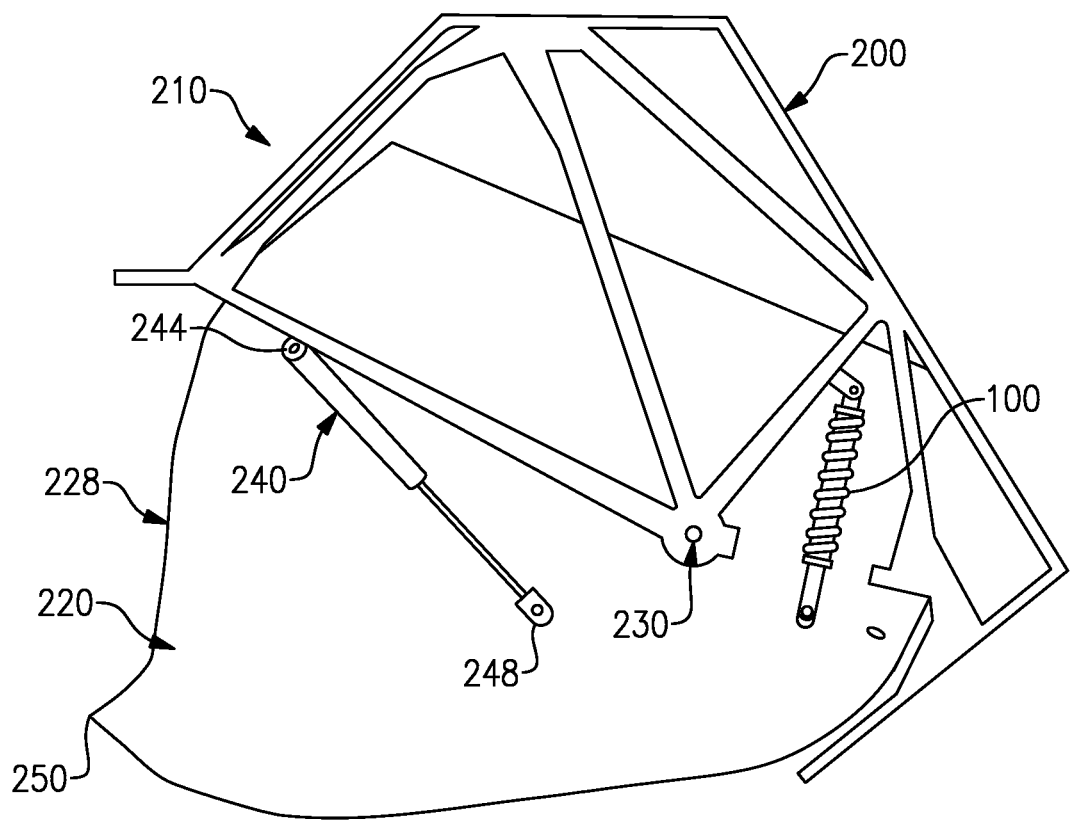
FIG. 10 is a partial view of a stowage bin, including the spring loaded actuator assembly of FIGS. 1-9.

The herein described spring loaded actuator assembly 100 can be used in connection with an aircraft stowage bin 210, as shown in FIG. 10. The stowage bin 210 comprises a frame 200, as well as a pivotal bin 228 connected to a pivot point 230. One end 190 of the actuator assembly 100 is attached to the frame 200 and the movable end 194 of the actuator assembly 100 is attached to the pivotal bin 228. A rate control 240 also is attached at one end 244 to the frame 200 and a movable end 248 to the stowage bin 210. The pivotal bin 228 includes a bin lip 250.

As shown, the stowage bin 210 is in the open position and in which no luggage is within the contents of the pivotal bin 228. In this position, the bin 228 can easily be closed without any impedance. The pivotal bin 228 is then loaded with luggage (not shown) to the point in which assistance is required to aid in the closing of the pivotal bin 228. The bin lip 250 is pulled down slightly to release the actuator assembly 100. Then as the pivotal bin 228 is raised, a spring force is applied to assist in raising and closing the pivotal bin 228. When the loaded bin 228 is opened to be emptied, the coil spring 160 provides resistance as the pivotal bin 228 is lowered to the open position. In the open position, the bin lip 250 is pulled down slightly which deselects the lift assistance to engage the spring retention mechanism and retain the coil spring 160 in the compressed position. Alternatively, the device can also be made responsive to the weight of the bin 228. For example and as the weight of the pivotal bin 228 approaches a predetermined weight, the pivotal bin 228 will toggle the spring retention mechanism to release or retain the spring force. The hydraulic rate control 240 is utilized to control the opening rate of the bin 228 so that the bin 228 will not open quickly when loaded with luggage. The hydraulic rate control 240 will also control the closing rate of the pivotal bin 228 if the lift assist is selected and the pivotal bin 228 is empty.

Figure 11:
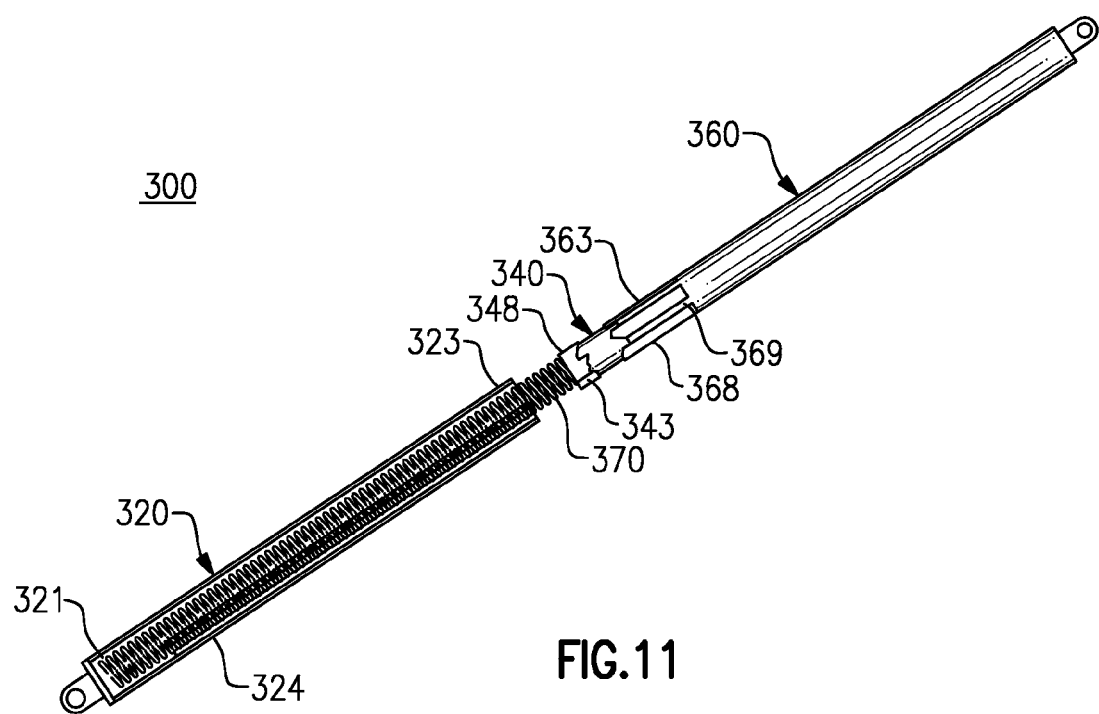
FIG. 11 is a partially exploded view of a spring loaded actuator assembly in accordance with another exemplary embodiment.

A second exemplary embodiment of a spring loaded actuator assembly is herein discussed with reference to FIGS. 11-13. Referring to FIG. 11, the spring loaded actuator assembly 300 comprises three (3) interconnected tubular members, herein referred to as a first tubular member 320, a second tubular member 340 and a third tubular member 360, respectively. The first tubular member 320 has an interior that is sized to retain each of the second and third tubular members 340, 360 and the second tubular member 340 has an interior that is sized to receive the third tubular member 360. According to this embodiment, the first tubular member 320 includes a set of internally disposed rails 324 that extend axially from a proximal end 323 of the tube 320 toward the distal end 321 thereof, the rails 324 being circumferentially spaced from one another. The total number of internally disposed rails 324 can easily be varied in which the rails are preferably equally spaced about the interior circumference of the first tubular member 320.

Figure 12:
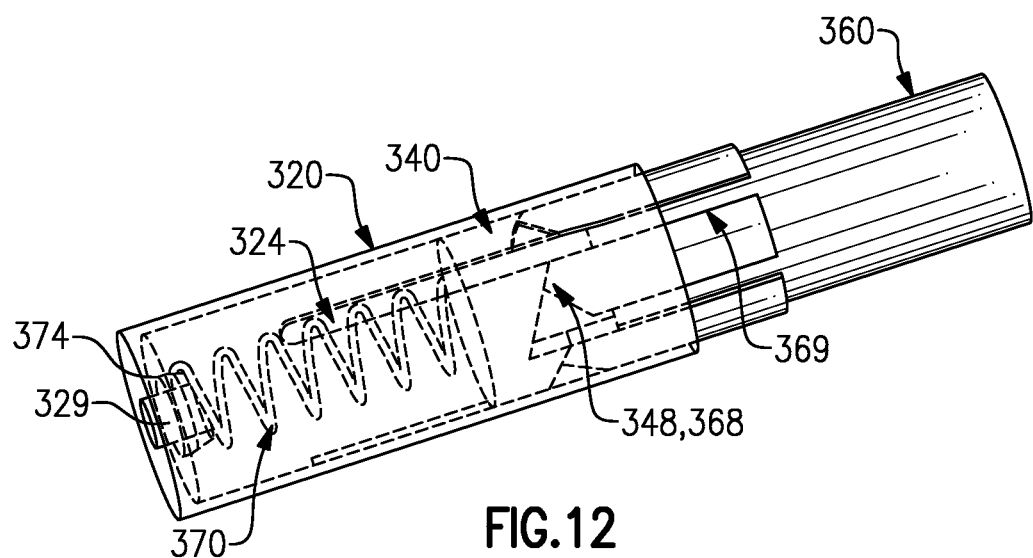
FIG. 12 is a partial view of the spring loaded actuator assembly of FIG. 11, partially broken away and with the assembly in an extended position.

A series of ramp-like teeth 348, 368 are provided at the distal end 343, 363 of each of the second and third tubular members 340, 360, wherein the teeth 368 of the third tubular member 360 are configured to engage the teeth 348 of the second tubular member 340 as shown in FIG. 12, thereby forming an interlocking arrangement when the second and third tubular members 340, 360 are moved into contact with one another. Grooves 349, 369 are provided between each of the ramp-like teeth 348, 368, which are sized and aligned to engage the internal rails 324 of the first tubular member 320 and enable the second and third tubular members 340, 360 to be moved in axial translation without rotation while engaged with the rails 324.

A coil spring 370 is further disposed within the first tubular member 320, one end 374 of which is fixedly attached to an internal post 329 at the distal end of the first tubular member 320. The remaining end (not shown) of the coil spring 370 is fixedly attached to the distal end of the second tubular member 340.

Figure 13:
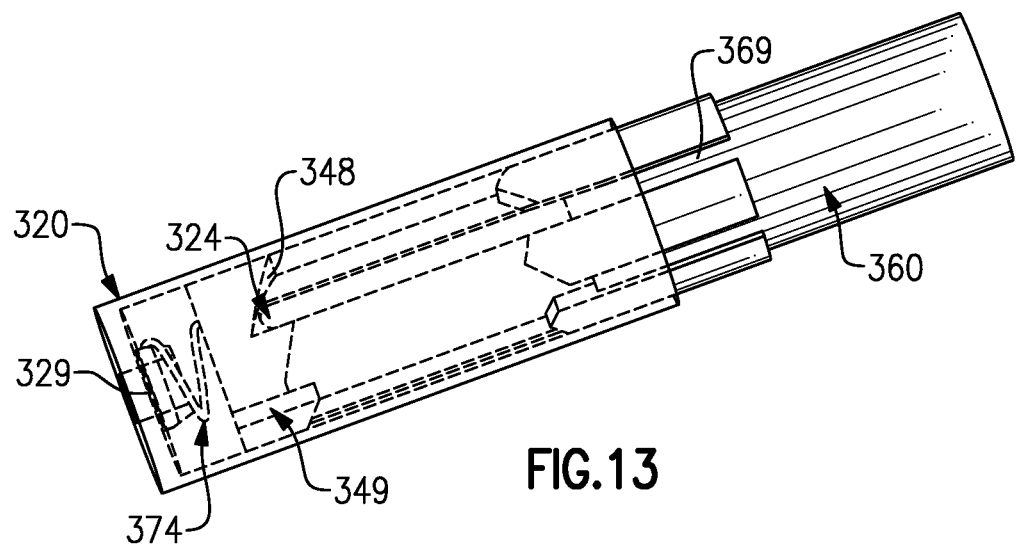
FIG. 13 is a partial view of the spring loaded actuator assembly of FIG. 12, partially broken away, with the assembly in a spring retained position.

FIGS. 12 and 13 illustrate two exemplary positions of the herein described actuator assembly 300. For purposes of this description, the distal end of the first tubular member 320 is assumed to be fixed wherein the second and third tubular members 340, 360 are axially movable relative to the first tubular member 320. FIG. 12 is a partial view of the spring loaded actuator assembly 300 that depicts an intermediate position in which the third tubular member 360 is advanced toward the first tubular member 320 such that the grooves 369 of the third tubular member 360 are aligned with the rails 324 of the first tubular member 320. In this position, the ramp-like teeth 348, 368 of the second and third tubular members 340, 360 are engaged in mating contact with one another, such that axial movement of the third tubular member 360 also causes corresponding axial (translational) movement of the engaged second tubular member 340 toward the first tubular member 320 and further initiating compression of the contained coil spring 370. The first and second tubular members 320 and 340 are constrained from rotation in this position.

As shown in FIG. 13, the second and third tubular members 340, 360 continue to advance axially toward the distal end of the first tubular member 320 based on the engagement between the rails 324 and the grooves 348, 368. As the ramp-like teeth 348 of the second tubular member 340 advance beyond the internal rails 324 of the first tubular member 320, the second tubular member 340 is caused to rotate about its primary axis due to the angled ramp surfaces of the teeth 348 and in which the second tubular member 360 becomes retained by the internal rails with the coil spring 370 being fully compressed and the third tubular member 360 being axially and freely movable. FIG. 13 illustrates the actuator assembly 300 following retainment of the second tubular member 340 and in which the third tubular member 360 has moved based on its attachment to another assembly (not shown).

As a result and in each herein described embodiment, the spring loaded actuator assembly 300 permits either a spring retained position in which a telescoping component is freely and axially movable without load and a spring released position in which both the freely movable and spring loaded components are movable and in which a spring release force can be stored and released.

PARTS LIST FOR FIGS. 1-13

100 spring actuator assembly
120 first tubular member
122 proximal end, first tubular member
123 distal end, first tubular member
128 ramp-like teeth
140 second tubular member
142 proximal end, second tubular member
143 distal end, second tubular member
144 shoulder, second tubular member
146 cylindrical section
148 ramp-like teeth
150 rod, substantially cylindrical
151 distal end
153 proximal end
154 external rails
160 coil spring
164 end, spring
166 end, spring
180 spring retainer
181 proximal end, spring retainer
183 distal end, spring retainer
184 shoulder, spring retainer
190 clevis
194 clevis
197 retaining ring
198 engagement portion
199 groove
200 frame
206 openings
220 movable component
228 pivotal bin
230 pivot point
240 hydraulic rate control
250 bin lip
300 spring-loaded actuator assembly
320 first tubular member
322 distal end, first tubular member
323 proximal end, first tubular member 324 internal rails
329 post, connecting
340 second tubular member
343 distal end, second tubular member
348 ramp-like teeth
349 grooves, second tubular member
360 third tubular member
362 distal end, third tubular member
368 ramp-like teeth, third tubular member
369 grooves, third tubular member
370 coil spring
374 spring end It will be readily apparent that there are other modifications and variations that can be contemplated, which employ the inventive concepts discussed herein.

The invention claimed is:

1. A spring loaded actuator assembly comprising:
  a first member having a set of axially disposed rails;
  a second member configured to translate axially relative to the first member;
  a third member configured for translational movement within the second member, each of the second and third members including:
    a set of teeth configured to engage one another when the third member is moved within the second member, the teeth being defined by a ramped surface; and
    grooves configured to engage the rails of the first member and permit translational movement of the second and third members relative to the first member while preventing rotational movement of the second and third members; and
  a coil spring disposed between the first and second members wherein translational movement of the second member beyond a predetermined axial position causes the teeth of the second member to extend beyond the rails, causing the second member to rotate and the teeth to be retained by the rails of the first member, thereby maintaining the coil spring in a compressed condition while enabling the third member to be freely movable axially.

2. The actuator assembly according to claim 1, in which the first member is a rod and the second and third members are tubular sections.

3. The actuator assembly according to claim 2, wherein the rails are disposed in the exterior of the rod.

4. The actuator assembly according to claim 3, wherein the coil spring is disposed on the exterior of the assembly.

5. The actuator assembly according to claim 1, wherein the first member is a tubular member.

6. The actuator assembly according to claim 5, wherein the rails are disposed along an interior surface of the first member.

7. The actuator assembly according to claim 6, wherein the coil spring is disposed within the interior of the assembly.

8. A spring-loaded actuator assembly, comprising:
  a rod including a set of axially extending rails;
  a pair of movable hollow tubular members including a first tubular member and a second tubular member in which the first tubular member is configured to move within the second tubular member; and
  a coil spring having respective ends attached to the rod and the second tubular member, each of the first and second tubular members including:
    a set of grooves configured to engage the axially ending rails of the rod to permit translational movement; and
    teeth that releasably couple the first and second tubular members for axial movement when engaged, the teeth having ramped surfaces;
  wherein translational movement of the second tubular member beyond a predetermined axial position causes the teeth of the second tubular member to extend beyond the rails, causing the second tubular member to be retained by the rails, thereby maintaining the coil spring in a compressed condition while enabling the first tubular member to be freely movable axially.

9. An actuator assembly according to claim 8, in which the coil spring is disposed on the exterior of the assembly.

10. A spring loaded actuator assembly comprising:
  a first member having a first keying feature;
  a second member configured to translate axially relative to the first member;
  a coil spring biasedly connecting the first member with the second member; and
  a third member configured for translational movement within the second tubular member, each of the second and third members including:
    a set of teeth configured to engage one another when the third member is axially moved within the second member, the teeth having ramped surfaces; and
    a second keying feature configured to engage the first keying feature of the first member and permit translational movement of the second and third members relative to the first member while preventing rotational movement of the second and third member,
  wherein translational movement of the second member beyond a predetermined axial position causes the teeth of the second member to extend beyond the first keying feature and causes the second member to be axially restrained, thereby maintaining the coil spring in a compressed condition while enabling the third member to freely move telescopically from the assembly.

11. The actuator assembly according to claim 10, in which the first keying feature is a set of axially disposed rails and the second keying feature is a corresponding set of grooves configured to pass over the rails.

12. The actuator assembly according to claim 11, in which the second and third members are tubular members having the teeth disposed at a distal end thereof.

13. The actuator assembly according to claim 12, in which the first member is a cylindrical rod in which the rails are axially disposed on the exterior of the rod and in which the grooves of the second and third members pass over the rails.

14. The actuator assembly according to claim 13, wherein the coil spring is attached to the exterior of the assembly.

15. The actuator assembly according to claim 12, in which the first member is a tubular member and in which the rails are axially disposed with an interior surface wherein the second and third members are configured to pass into the interior of the first member.

16. The actuator assembly according to claim 15, wherein the coil spring is attached to the interior of the assembly.

17. The actuator assembly according to claim 10, in which the assembly is configured for use in an aircraft stowage bin to selectively provide an assist force to a pivoting stowage bin.

* * * * *